Patented Jan. 2, 1945

2,366,396

UNITED STATES PATENT OFFICE 2,366,396

RUBBER SUBSTITUTE AND METHOD OF MAKING THE SAME

Edward D. Hallett, Phoenix, Ariz.

No Drawing. Application August 22, 1941,
Serial No. 407,999

6 Claims. (Cl. 106—126)

This invention relates to the production of a rubber substitute. I use this term to define a product not having latex as a base, although my rubber substitute has all the desirable characteristics of rubber and from a standpoint of use can scarcely be distinguished therefrom.

It is an object of my invention to produce as a new article of manufacture a composition which approximates the physical characteristics of rubber, but without the use of latex or any product from the rubber plant or any of the commonly known species of latex yielding plant, but which has as one of its principal constituents a vegetable product which is readily obtainable and inexpensive.

I have discovered that the liquid or juice obtained from Johnson grass may be used for this purpose.

Johnson grass, the botanical name for which is *Andropogon halepensis*, commonly grows as a pest or weed in the western and southern portions of the United States. It can be cultivated very easily and will mature from seed in about sixty days. Under favorable conditions five crops a year can be cut.

Preparatory to blending the "rubber" composition, I prepare the Johnson grass by treating it in any suitable roll press or crusher or other mechanical device for pressing and extracting the juice. I have been able to readily obtain one pint of juice from approximately two pounds of Johnson grass. This amount may vary depending upon the quality of the grass, and the efficiency of the press or crusher. One or more crushing and pressing operations may be employed.

Having prepared the Johnson grass juice, I mix and blend it with other ingredients in the manner hereinafter described; and while my formula may be varied to suit conditions, and to produce "rubber" of different characteristics, by way of example but not of limitation the following has been found satisfactory:

| | Parts |
|---|---|
| Johnson grass juice | 12 |
| Boiled linseed oil | 8 |
| Ground glue | 1 |
| Powdered sulphur | ¾ |
| Lamp black | ½ |

To this I may optionally add from ⅛ to ⅓ of a part of antimony black.

My preferred method for treating and blending the above ingredients is to heat the Johnson grass juice and the linseed oil in separate vessels until they come to a boil. I then add one to the other, maintaining the mixture at the boiling point. The other ingredients may then be added in any order, maintaining the mixture at a low boil for approximately one and one-half hours, or until the "rubber" actually forms. The mass should be slowly stirred while boiling.

It will be found that after approximately one and a half hours the bulk of the mass assumes the appearance and tacky homogeneous consistency of crude rubber. There is a small residue of liquid which forms during the process and which may be poured off, the remaining bulky mass having all of the primary characteristics of crude rubber.

It is desirable to let this mass set for approximately twenty-four hours, at the expiration of which time it can be run through rolls and worked or otherwise processed in exactly the same manner as crude rubber.

The purpose of the antimony black, if used, is to put a little greater tenacity in the product.

I have found that my product has all of the desirable physical properties of rubber with the great advantage of being produced much cheaper than rubber and of materials which are readily obtainable locally. There are vast areas of land in the United States suitable for the cultivation of Johnson grass and it can be grown cheaply and very rapidly. My product is also much cheaper to manufacture than synthetic "rubbers" made of petroleum derivatives and in many ways more nearly resembles rubber than do these petroleum derivative products. My product will readily vulcanize and can be used for any of the purposes for which conventional rubber is employed.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent compositions of matter and the process or methods of making the same.

Having described my invention, what I claim as new and desire to secure by Letters Patent is:

1. A process for manufacturing a product resembling rubber comprising the following steps: expressing the natural juice from Johnson grass, bringing the said juice to a boil, separately heating linseed oil to a boil, adding one of the said ingredients to the other while hot, and maintaining the mixture at a boiling point until a tacky, homogeneous mass has formed.

2. A process for manufacturing a product resembling rubber comprising the following steps: expressing the natural juice from Johnson grass, bringing the said juice to a boil, separately heating linseed oil to a boil, adding one of the said ingredients to the other while hot, adding glue, sulphur and lamp black, and maintaining the mixture at a boiling point until a tacky, homogeneous mass has formed.

3. A process for manufacturing a product resembling rubber comprising the following steps: expressing the natural juice from Johnson grass, bringing the said juice to a boil, separately heating linseed oil to a boil, adding one of the said ingredients to the other while hot, adding glue, sulphur, lamp black, and antimony black, and maintaining the mixture at a boiling point until a tacky, homogeneous mass has formed.

4. A process for manufacturing a product resembling rubber comprising the following steps: expressing the natural juice from Johnson grass, bringing the said juice to a boil, separately heating linseed oil to a boil, adding one of the said ingredients to the other while hot, adding glue, sulphur, lamp black, and antimony black, and boiling the whole mass for approximately one and one-half hours.

5. A process for manufacturing a product resembling rubber comprising the following steps: expressing the natural juice from Johnson grass, bringing the said juice to a boil, separately heating linseed oil to a boil, adding one of the said ingredients to the other while hot, adding glue, sulphur, lamp black, and antimony black, and boiling the whole mass for approximately one and one-half hours, and allowing the mass to set.

6. A composition of matter resembling rubber resulting as a product from the method comprising the steps of expressing the natural juice from Johnson grass, bringing the said juice to a boil, separately heating linseed oil to a boil, adding one of the said ingredients to the other while hot, and maintaining the mixture at the boiling point until a tacky homogeneous mass has formed.

EDWARD D. HALLETT.